(12) United States Patent
Gu et al.

(10) Patent No.: US 9,628,152 B2
(45) Date of Patent: Apr. 18, 2017

(54) SIGNAL DETECTION METHOD AND APPARATUS IN MIMO COMMUNICATION SYSTEM

(71) Applicant: Intel Corporation, Santa Clara, CA (US)

(72) Inventors: Jian Gu, Fremont, CA (US); Fei-Feng Xu, Beijing (CN)

(73) Assignee: Intel Coporation, Santa Clara, CA (US)

( * ) Notice: Subject to any disclaimer, the term of this patent is extended or adjusted under 35 U.S.C. 154(b) by 0 days.

(21) Appl. No.: 14/849,668

(22) Filed: Sep. 10, 2015

(65) Prior Publication Data

US 2016/0241310 A1    Aug. 18, 2016

(30) Foreign Application Priority Data

Feb. 17, 2015   (CN) .......................... 2015 1 0086670

(51) Int. Cl.

| H04B 7/04 | (2006.01) |
|---|---|
| H04B 7/0413 | (2017.01) |
| H04L 1/00 | (2006.01) |
| H04L 1/18 | (2006.01) |

(52) U.S. Cl.
CPC ......... *H04B 7/0413* (2013.01); *H04L 1/0054* (2013.01); *H04L 1/1812* (2013.01)

(58) Field of Classification Search
CPC ... H03D 1/00; H04B 7/02; H04B 7/04; H04B 7/0413; H04B 7/24; H04B 17/00; H04L 1/00; H04L 1/0054; H04L 1/02; H04L 1/18; H04L 1/1812; H04L 5/00; H04L 23/02; H04L 27/00; H04L 27/06; H04L 27/28; H04J 11/00; H04J 99/00; H04K 1/10; H04W 24/02; H04W 72/00
USPC ........ 370/203, 232, 546; 375/219, 260, 262, 375/267, 295, 316, 340, 343, 346; 714/704, 748, 755
See application file for complete search history.

(56) References Cited

U.S. PATENT DOCUMENTS

| 7,961,826 B2 * | 6/2011 | Waters .............. H04L 25/03242 375/340 |
|---|---|---|
| 8,223,853 B2 * | 7/2012 | Vijayan ................. H04L 1/0045 341/143 |
| 8,325,840 B2 * | 12/2012 | Bursalioglu .......... H04L 1/0631 375/260 |

(Continued)

*Primary Examiner* — Shawkat M Ali
(74) *Attorney, Agent, or Firm* — Schiff Hardin LLP (57) ABSTRACT

A method for detecting a signal, used in a multi-input multi-output (MIMO) communications system, including: receiving a vector associated with data bits transmitted from the MIMO communications system; finding a first layer from the received vector according to a determining condition, wherein the received vector includes multiple layers, and the multiple layers include the first layer and remaining layers; performing a first scanning procedure for the multiple layers of the received vector to obtain log likelihood ratios (LLR) corresponding to the data bits transmitted from the remaining layers; obtaining a received vector of the first layer according to an equivalent received vector of the remaining layers; and performing a second scanning procedure on data bits of the first layer according to the received vector of the first layer to generate an LLR corresponding to the data bits of the first layer.

14 Claims, 5 Drawing Sheets

(56) References Cited

U.S. PATENT DOCUMENTS

| | | | | |
|---|---|---|---|---|
| 8,559,543 B1* | 10/2013 | Lee | ............... | H04B 7/0413 375/267 |
| 8,929,472 B1* | 1/2015 | Lee | ............... | H04B 7/0885 375/267 |
| 9,059,828 B1* | 6/2015 | Duarte | ............... | H04L 1/0054 |
| 2003/0003863 A1* | 1/2003 | Thielecke | ............... | H04B 7/0417 455/39 |
| 2005/0157822 A1* | 7/2005 | Khandekar | ............... | H04L 27/3488 375/340 |
| 2007/0127589 A1* | 6/2007 | Hwang | ............... | H04B 7/0848 375/267 |
| 2009/0135947 A1* | 5/2009 | Bahng | ............... | H04L 25/03203 375/295 |
| 2009/0135964 A1* | 5/2009 | Bahng | ............... | H04L 1/0054 375/341 |
| 2010/0086067 A1* | 4/2010 | Oka | ............... | H04B 7/0413 375/260 |
| 2010/0124301 A1* | 5/2010 | Bahng | ............... | H04L 1/0656 375/341 |
| 2010/0177837 A1* | 7/2010 | Leonidovich | ............... | H04L 1/0631 375/267 |
| 2010/0232535 A1* | 9/2010 | Yue | ............... | H04L 1/0048 375/267 |
| 2010/0239043 A1* | 9/2010 | Li | ............... | H04L 25/03242 375/267 |
| 2014/0056390 A1* | 2/2014 | Seyama | ............... | H04L 1/0054 375/341 |
| 2015/0341127 A1* | 11/2015 | Hwang | ............... | H04B 7/0413 375/224 |

\* cited by examiner

SIGNAL DETECTION METHOD AND APPARATUS IN MIMO COMMUNICATION SYSTEM

CROSS REFERENCE TO RELATED APPLICATIONS

This application claims priority of Chinese Patent Application Serial Number CN201510086670.4, filed on Feb. 17, 2015, the disclosures of which are incorporated herein by reference in their entirety.

BACKGROUND OF THE INVENTION

Field of the Invention

The present disclosure relates generally to a wireless communications system, and more particularly, to a signal detection method and apparatus for reducing the complexity of the maximum likelihood detection in a multiple-input multiple-output (MIMO) communications system.

Description of the Related Art

Wireless communication systems have become a prevalent means by which a majority of people worldwide have come to communicate. This is due in large part to the fact that recent advances in wireless communication technology have considerably improved the ability of such systems to carry data relating to voice, video, packet data, broadcast, messaging, and other services used in communication. In particular, multiple-input multiple-output (MIMO) communication systems are receiving increased attention due to their ability to improve the capacity of a wireless communication system through the use of multiple antennas for simultaneously transmitting and receiving data. Using a MIMO communication system, data can be divided into multiple streams, which can be sent and received simultaneously to improve system capacity without requiring significant additional spectrum or power.

In typical MIMO communication systems, data is transmitted by dividing the data into streams, grouping bits in each stream, mapping each group of bits to constellation points, and then transmitting the streams via multiple transmit antennas as modulated carrier waves based on the constellation points mapped for each stream. Once transmitted, the data passes through an effective MIMO channel, after which resulting spatial streams are received by multiple antennas at a receiver. Conventional MIMO receivers then employ a variety of signal detection techniques to obtain data from streams received at receiving antennas. One such technique, Soft-Output Maximum-Likelihood Detection (SOMLD), can obtain the expected value of a detected transmitted bit as well as the likelihood that the expected value is correct. Conventional SOMLD techniques require looping over all constellation points used by the transmitter for each transmitted stream and determining a distance metric for each constellation point to find the likelihood of each bit in the streams. However, to determine optimal distance metrics in conventional SOMLD, additional looping is required over all constellation points for all other streams, effectively requiring looping over all possible combinations of constellation points for all streams. This procedure has exponential computational complexity, which makes it prohibitively costly for many applications, including applications that could benefit from soft-output detection. Thus, there exists a need in the art for low-complexity techniques that achieve Maximum-Likelihood-Detection (MLD) performance or near-MLD performance for hard-decision output detection, or that achieve SOMLD performance or near-SOMLD performance for soft-decision output signal detection in MIMO communication systems.

BRIEF SUMMARY OF THE INVENTION

A method for detecting a signal is provided. The method is used in a multi-input multi-output (MIMO) communications system. The method comprises: receiving a vector associated with data bits transmitted from the MIMO communications system; finding a first layer from the received vector according to a determining condition, wherein the received vector comprises multiple layers, and the multiple layers comprise the first layer and remaining layers; performing a first scanning procedure for the multiple layers of the received vector to obtain log likelihood ratios (LLR) corresponding to the data bits transmitted from the remaining layers; obtaining a received vector of the first layer according to an equivalent received vector of the remaining layers; and performing a second scanning procedure on data bits of the first layer according to the received vector of the first layer to generate an LLR corresponding to the data bits of the first layer.

A signal detection apparatus in a multi-input multi-output (MIMO) communications system is provided. The signal detection apparatus comprises a receiver, a determining element, and a scanning element. The receiver receives a vector associated with data bits transmitted from the MIMO communications system. The determining element finds a first layer from the received vector according to a determining condition, wherein the received vector comprises multiple layers, and the multiple layers comprise the first layer and remaining layers. The scanning element performs a first scanning procedure for the multiple layers of the received vector to obtain log likelihood ratios (LLR) corresponding to the data bits transmitted from the remaining layers, obtains a received vector of the first layer according to an equivalent received vector of the remaining layers and performs a second scanning procedure on data bits of the first layer according to the received vector of the first layer to generate an LLR corresponding to the data bits of the first layer.

The following description is of the best-contemplated mode of carrying out the invention. This description is made for the purpose of illustrating the general principles of the invention and should not be taken in a limiting sense. The scope of the invention is best determined by reference to the appended claims.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Several exemplary embodiments of the present disclosure are described with reference to FIGS. 1 through 5C, which generally relate to a signal detection method and a signal detection apparatus. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

Figure 1:
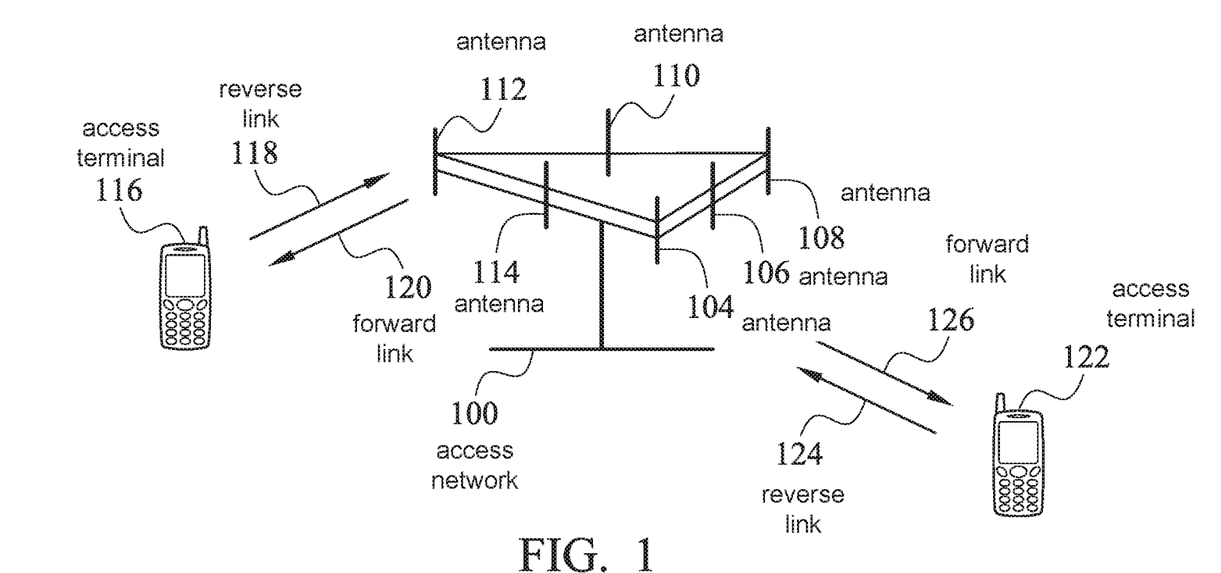
FIG. 1 shows a multiple access wireless communications system according to one embodiment of the invention.

FIG. 1 shows a multiple access wireless communications system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. An access terminal 116 (AT) is in communication with the antennas 112 and 114, where the antennas 112 and 114 transmit information to an access terminal 116 over forward a link 120 and receive information from the access terminal 116 over the reverse link 118. An access terminal (AT) 122 is in communication with the antennas 106 and 108, where the antennas 106 and 108 transmit information to the access terminal (AT) 122 over a forward link 126 and receive information from the access terminal (AT) 122 over a reverse link 124. In a FDD system, communication links 118, 120, 124 and 126 may use different frequency for communication. For example, the forward link 120 may use a different frequency then that used by the reverse link 118.

Each group of antennas and/or the area in which they are designed to communicate is often referred to as a sector of the access network. In the embodiment, antenna groups each are designed to communicate to access terminals in a sector of the areas covered by the access network 100.

In communication over the forward links 120 and 126, the transmitting antennas of the access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
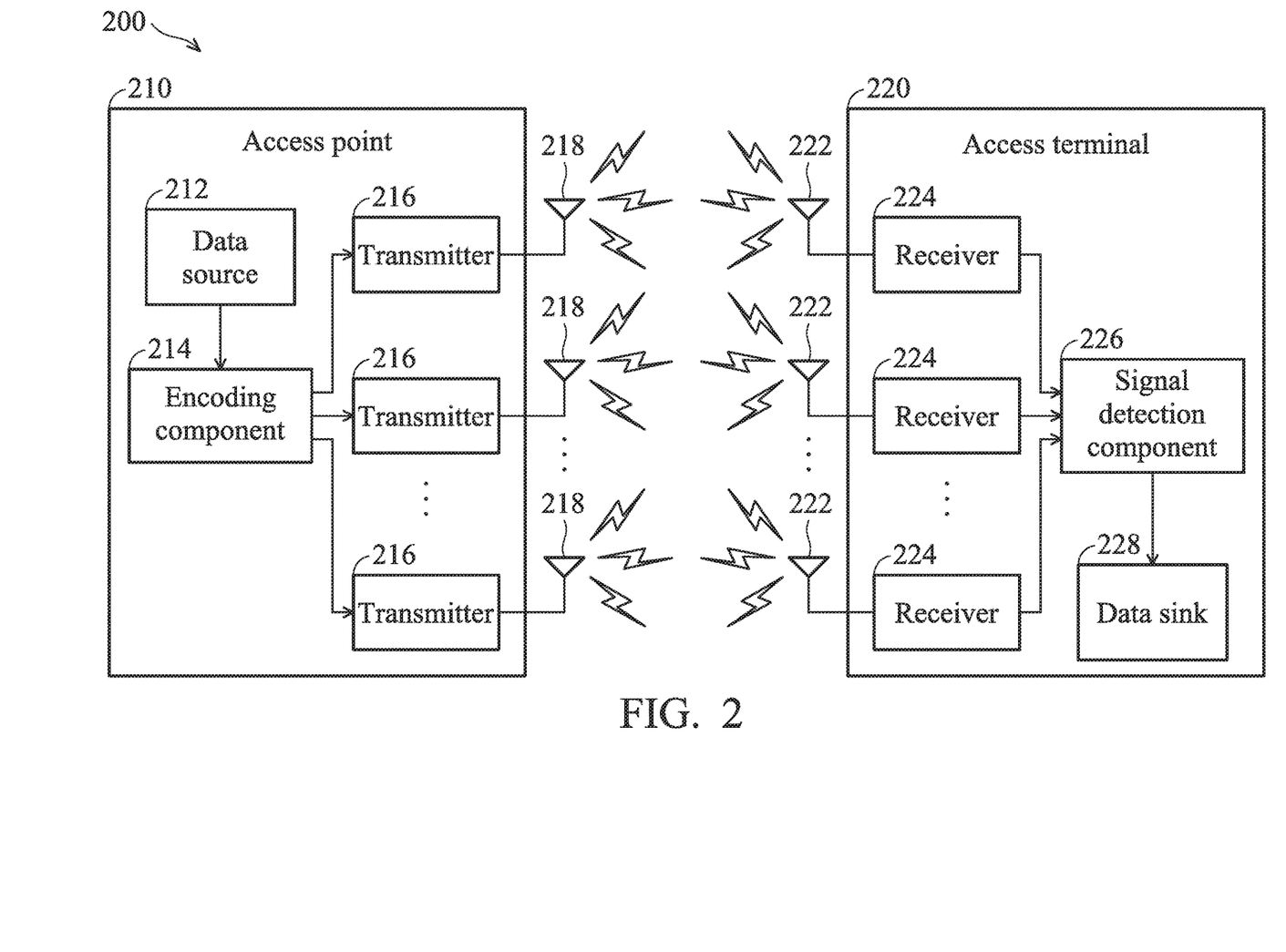
FIG. 2 is a schematic diagram of a multiple-input multiple-output (MIMO) system according to one embodiment of the invention.

FIG. 2 is a schematic diagram of a multiple-input multiple-output (MIMO) system 200 according to one embodiment of the invention. In one embodiment, the MIMO system 200 comprises an access point (AP) 210 that can communicate with an access terminal (AT) 220. While only one AP 210 and AT 220 are illustrated in the MIMO system 200 for brevity, it should be appreciated that the MIMO system 200 can include any number of the APs and/or the ATs. Furthermore, while the following discussion generally relates to communication from the AP 210 to the AT 220 (e.g., communication over the forward links 120 and 126), it should be appreciated that similar components and techniques could be employed by the AP 210 and/or the AT 220 for communication from the AT 220 to the AP 210 (e.g., communication over the reverse links 118 and 124).

In one embodiment, the AP 210 includes a data source 212 that can generate or otherwise obtain data for transmission to one or more ATs 220. Data from the data source 212 can be sent to an encoding component 214 to process the data for communication to the AT 220 via the MIMO transmission. At the encoding component 214, a series of bits comprising data to be transmitted to the AT 220 can be grouped into spatial streams for simultaneous transmission by transmitters (TMTRs) 216 via antennas 218. Furthermore, the encoding component can modulate each spatial stream using one or more digital modulation techniques, such as phase-shift keying (PSK), binary phase-shift keying (BPSK), quadrature phase-shift keying (QPSK), 16-point quadrature amplitude modulation (16-QAM), 64-point quadrature amplitude modulation (64-QAM), and/or another suitable modulation technique, under which bits of data comprising each stream can be mapped to a series of modulation symbols based on a set of constellation points. Additionally and/or alternatively, orthogonal frequency division multiplexing (OFDM) can be utilized to divide a spatial stream among multiple orthogonal subcarriers such that each subcarrier can be individually modulated using one or more modulation techniques. Mapped modulation symbols for each stream can then be provided to respective transmitters 216 for communication to the AT 220 as modulated analog signals via a series of V antennas 218.

At the AT 220, spatial streams corresponding to signals transmitted by the AP 210 can be received by a series of N receivers (RCVRs) 224 via respective antennas 222. In one embodiment, an N-dimensional received vector r corresponding to the streams received at the AT 220 can be expressed as follows:

$$r = Hs + n, \quad (1)$$

where H is an N×V matrix that represents the effective MIMO channel through which transmitted signals pass between the AP 210 and the AT 220, s is a V-dimensional transmit vector corresponding to the streams transmitted from the AP 210, wherein s is composed of a plurality of independent symbols selected from a Q-ary constellation. In addition, n is an N-dimensional vector that represents additive noise.

In another embodiment, spatial streams received by receivers 224 can be conveyed to a signal detection component 226, which can utilize the streams received by the receivers 224 and knowledge of the effective MIMO channel to obtain the streams transmitted by the AP 210. In accordance with one aspect, the signal detection component 226 can determine hard-decision outputs for bits in spatial streams received from the AP 210 by determining the expected sign of each bit. For example, bits having a value of 1 can be represented by a hard-decision output of +1 while bits having a value of 0 can be represented by a hard-decision output of −1. Alternatively, the signal detection component 226 can determine soft-decision outputs for bits in spatial streams received from the AP 210 by determining the expected sign of each bit in addition to the likelihood that the respective expected sign for each bit has been detected correctly, e.g., the likelihood that a bit was sent as +1 or −1. In accordance with another aspect, the signal detection component 226 can provide low-complexity soft-output detection by employing a near-Soft-Output Maximum Likelihood Detection algorithm as described below. After successful detection, the detected transmitted streams can be provided to a data sink 228 for use by the AT 220.

Figure 3:
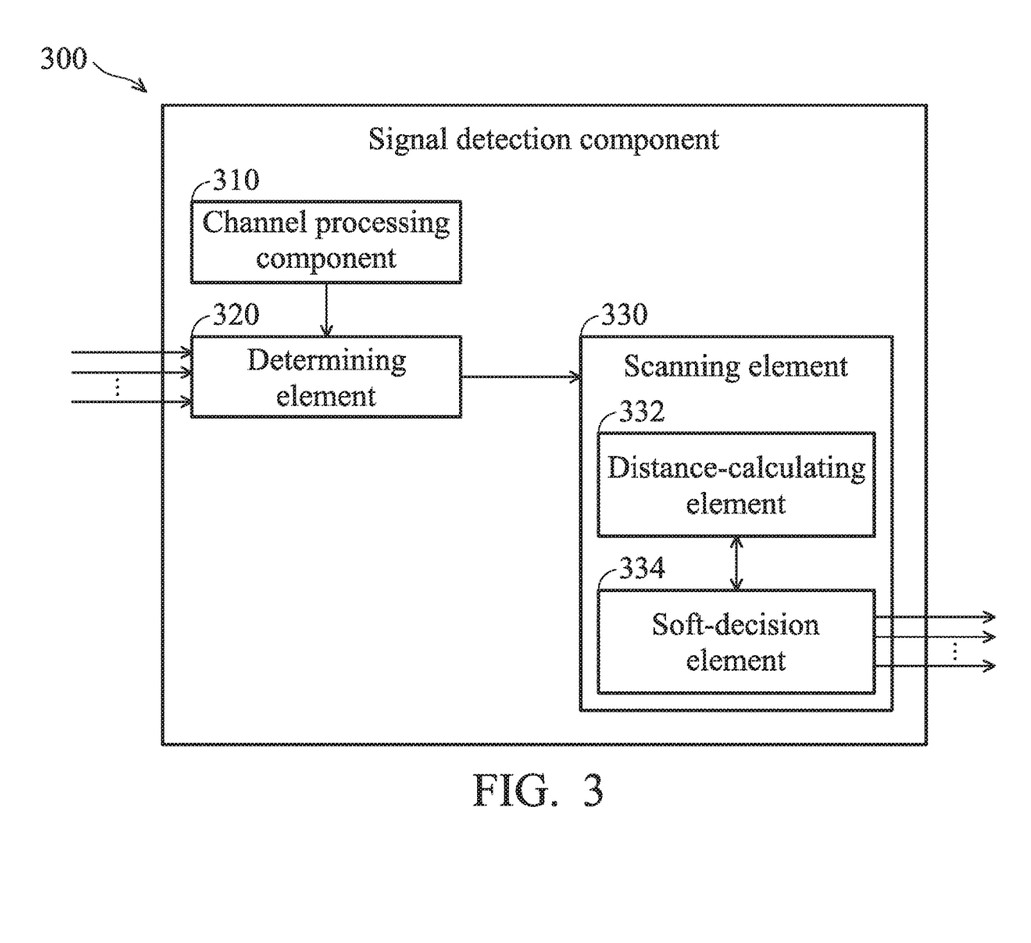
FIG. 3 is a block diagram illustrating an example signal detection component that can be utilized in a MIMO communications system according to an embodiment of the invention.

FIG. 3 is a block diagram illustrating an example signal detection component 300 that can be utilized in a MIMO communications system according to an embodiment of the invention. By way of specific, non-limiting embodiment, the signal detection component 300 can be used in MIMO systems employing IEEE 802.11n or a similar standard, Multi-User Detection applications, multi-mode fiber applications, and/or any other suitable communication systems or applications. Furthermore, it should be appreciated that signal detection component 300 can be utilized by any appropriate network entity in the MIMO communications system, such as an access point (e.g., the AP 210), an access terminal (e.g., the AT 220), and/or any other suitable entity. In addition, the signal detection component 300 may be internal to an associated network entity or an external component that is connected to one or more associated network entities.

In accordance with one aspect, the signal detection component 300 includes a MIMO channel processing component 310 that can determine and/or store information relating to an effective MIMO channel through which spatial streams are transmitted to a network entity (e.g., the AP 210 and/or the AT 220). In one example, the MIMO channel processing component 310 can represent channel information as a MIMO channel matrix, which can be similar in structure to MIMO channel matrix H utilized in Equation (1). By way of specific example, the MIMO channel processing component 310 can obtain the MIMO channel matrix through training based on, for example, preambles attached to one or more packets received at the signal detection component 300; through one or more blind and/or semi-blind channel estimation techniques; and/or through other suitable techniques.

In accordance with another aspect, the signal detection component 300 comprises a determining element 320. The determining element 320 can obtain a series of received streams, which can be communicated by an array of receivers (e.g., the receivers 224) and/or other suitable components or network entities. The determining element 320 can find a first layer from the received vector according to a determining condition, wherein the determining condition used to find the first layer from the received vector by the determining element 320 is determined according one or more than one factor. The factors comprises: the first layer has the lowest data transmission rate in comparison with the remaining layers; the first layer has a signal to noise ratio (SNR) higher than the remaining layers; an initial hybrid automatic repeat request (HARM) data is transmitted by the first layer; and a modulation order used in the first layer is the lowest in all of the layers.

The signal detection component 300 further comprises a scanning element 330, used to perform a first scanning procedure and a second scanning procedure for remaining layers of the received vector to obtain log likelihood ratios (LLR) corresponding to the data bits transmitted from remaining layers, wherein the multiple layers comprise the first layer and the remaining layers. The first scanning procedure and the second scanning procedure are described in more detail below. The scanning element 330 further includes a distance-calculating element 332 and a soft-decision element 334. The distance-calculating element 332 is used to obtain respective minimum Euclidean distances of all the layers, and selects a minimum value from the respective minimum Euclidean distances as a first Euclidean distance. After the distance-calculating element 332 obtains the first Euclidean distance, the distance-calculating element 332 compares the first Euclidean distance of the first layer with each minimum Euclidean distance of the remaining layers to update respective minimum Euclidean distances of all the layers.

After the distance-calculating element 332 updates the respective minimum Euclidean distances of all the layers, the soft-decision element 334 generates LLRs corresponding to the data bits transmitted from the remaining layers according to the minimum Euclidean distances.

The distance-calculating element 332 further obtains a maximum likelihood (ML) value corresponding to the first Euclidean distance according to the first Euclidean distance, calculates an equivalent received vector of the remaining layers according to the maximum likelihood (ML) value. After calculating the equivalent received vector of the remaining layers, the distance-calculating element 332 removes the equivalent received vector of the remaining layers from the received vector to obtain the received vector of the first layer.

The distance-calculating element 332 and the soft-decision element 334 further perform the second scanning procedure. The distance-calculating element 332 obtains respective minimum Euclidean distances of each bit in the first layer according to the first Euclidean distance. The soft-decision element 334 generates an LLR corresponding to the data bits transmitted from the first layer according to the respective minimum Euclidean distances.

Figure 4:
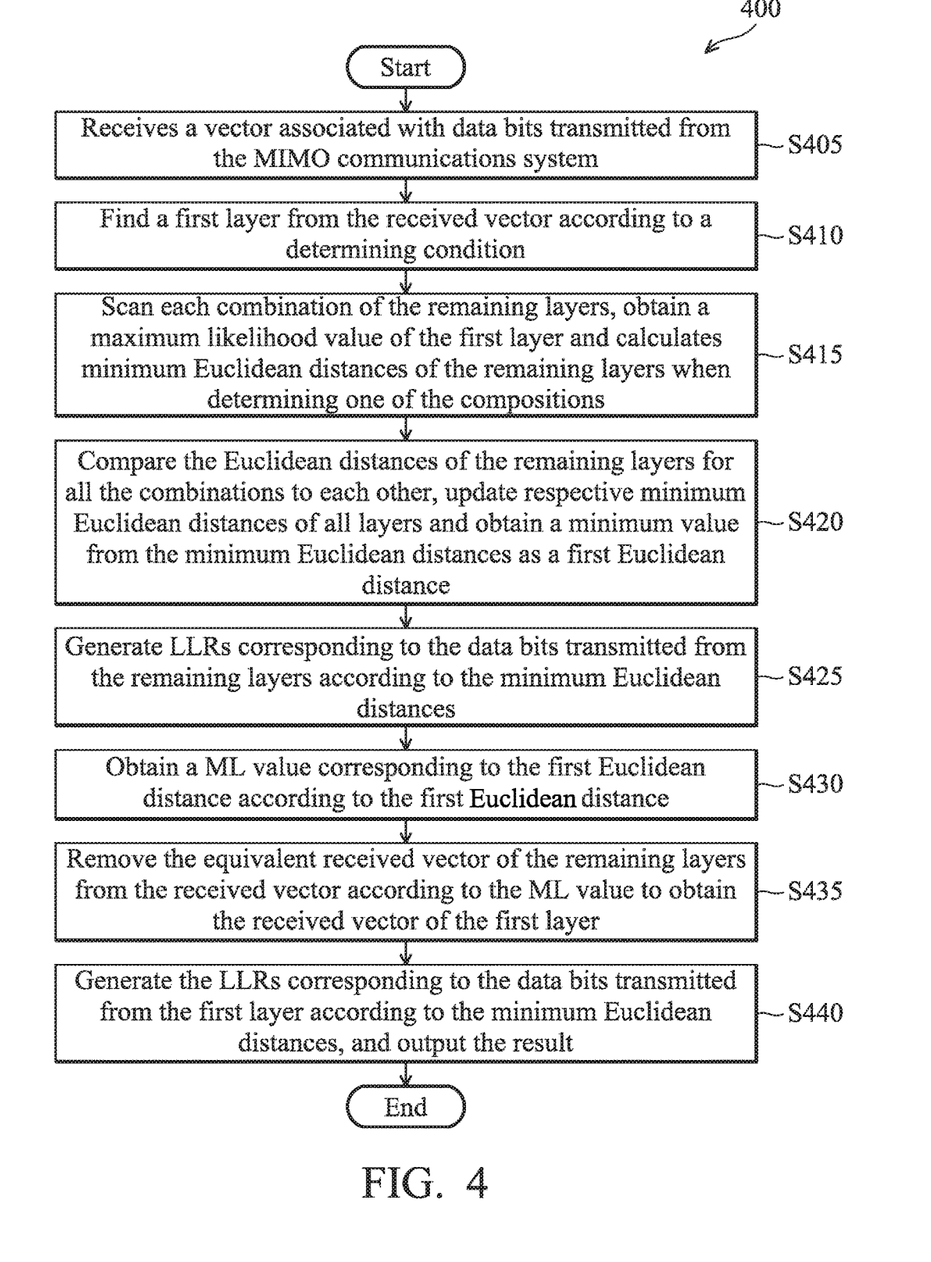
FIG. 4 is a flow diagram of a signal detection method according to one embodiment of the invention.

FIG. 4 is a flow diagram 400 of a signal detection method according to one embodiment of the invention. While, for purposes of simplicity of explanation, the methodologies are shown and described as a series of acts, it should be understood and appreciated that the methodologies are not limited by the order of acts, as some acts may, in accordance with one or more embodiments, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 4, the signal detection method 400 in a MIMO communications system (e.g., a communications system 200) is illustrated. It should be appreciated that the signal detection method 400 can be performed by a base station (e.g., the AP 210), a mobile terminal (e.g., then AT 220), and/or any other suitable entity in a wireless communications network.

In step S405, the receiver receives a vector associated with data bits, i.e., r shown in Equation (1), transmitted from the MIMO communications system. Then, in step S410, the determining element finds a first layer from the received vector according to a determining condition. In step S415, the distance-calculating element scans each combination of the remaining layers, obtains a maximum likelihood value of the first layer and calculates minimum Euclidean distances of the remaining layers when determining one of the compositions. In one embodiment, the minimum Euclidean distances of the remaining layers can be calculated as follows:

$$d_s^2 = \|r - \tilde{H}\tilde{s} - h_1 \hat{s}_1(\tilde{s})\|^2, \tag{2}$$

wherein $\tilde{H}$ is a channel matrix of the remaining layers of the channel matrix H, $\tilde{s}$ is a signal vector of the remaining layers, $h_1$ is a channel vector of the first layer, $\hat{s}_1$ is a maximum likelihood (ML) value of the signal vector of the first layer.

Then, in step S420, the distance-calculating element compares the Euclidean distances of the remaining layers for all the combinations to each other, updates respective minimum Euclidean distances of all layers and obtains a minimum value from the minimum Euclidean distances as a first Euclidean distance, wherein a solution corresponding to the first Euclidean distance is the maximum likelihood solution value. In an embodiment, the distance-calculating element can use the following equation to compare the first Euclidean distance with the minimum Euclidean distances of the remaining layers:

$$d_{min}^{(p)^2}[k]=\min(d_{min}^{(p)^2}[k],d_s^2), \quad (3)$$

wherein $d_{min}^{(p)^2}[k]\equiv\min_{s\in S_k^{(p)}}(d_s^2)$, p is 0 or 1. In addition, in one embodiment, the minimum Euclidean distance of the first layer can be redefined as $d_{ini}^{(p)^2}[k]=d_{min}^{(p)^2}[k]$.

In step S425, the soft-decision element generates log likelihood rates (LLRs) corresponding to the data bits transmitted from the remaining layers according to the minimum Euclidean distances. In one embodiment, the soft-decision element can use the following equation to generate the LLRs corresponding to the data bits transmitted from the remaining layers:

$$LLR_k \cong \frac{1}{\sigma^2}[d_{min}^{(0)2}[k] - d_{min}^{(1)2}[k]]. \quad (4)$$

Next, in step S430, the distance-calculating element further obtains a maximum likelihood (ML) value $\hat{s}$ corresponding to the first Euclidean distance according to the first Euclidean distance. In step S435, the distance-calculating element removes the equivalent received vector of the remaining layers from the received vector according to the ML value to obtain the received vector of the first layer. In one embodiment, the received vector of the first layer can be represented as the following equation.

$$r'=r-\tilde{H}\hat{s}_{[2,\ldots,\nu_T]}. \quad (5)$$

Figure 5A:
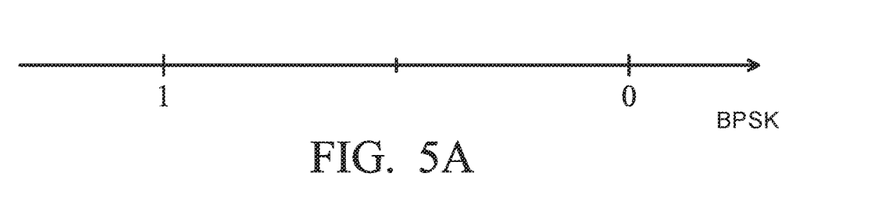
FIGS. 5A-5C are schematic diagrams of modulation according to one embodiment of the invention.

Next, in step S435, the distance-calculating element calculates respective Euclidean distances of each bit of all the layers according to the second scanning procedure, and compares the respective Euclidean distances of each bit with the minimum Euclidean distance of the first layer to obtain respective minimum Euclidean distances of each bit of the first layer. Finally, in step S440, the soft-decision element generates the LLRs corresponding to the data bits transmitted from the first layer according to the minimum Euclidean distances, and outputs the result, wherein the LLRs corresponding to the data bits transmitted from the first layer can be still calculated by using Equation (4). It should be noted that, in step S435, the distance-calculating element can use different digital modulation techniques according to the following algorithm to calculate the respective minimum Euclidean distances of each bit of the first layer. For example, for quadrature phase shift key (QPSK), I and Q may be referred to as output values $b_1$ and $b_2$, respectively. QPSK can be considered as two separate binary phase shift key (BPSK), as shown in FIG. 5A. Therefore, the respective minimum Euclidean distances of each bit of the first layer can be represented as the following equation:

$$d_{min}^{(1-P)^2}[1]=\|r'-h_1\text{soft}[\bar{b}_1b_2]\|^2, \text{ and}$$

$$d_{min}^{(1-P)^2}[2]=\|r'-h_1\text{soft}[b_1\bar{b}_2]\|^2, \quad (6)$$

wherein $\bar{b}_k$ is an inverse of $b_k$, soft[ ] means to transfer the binary symbol $[b_1b_2]$ to a real number. When a symbol is transmitted, "0" is mapped to "$+1/\sqrt{2}$", and "1" is mapped to "$-1/\sqrt{2}$".

Figure 5B:
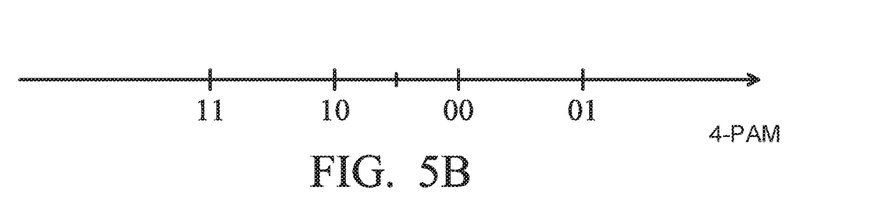

In another example, for 16 quadrature amplitude modulation (16-QAM), I and Q may be referred to as output values $b_1$, $b_3$ and $b_2$, $b_4$, respectively. 16-QAM can be considered as two independent 4-Pulse Amplitude Modulation (4-PAM), as shown in FIG. 5B. Therefore, the respective minimum Euclidean distances of each bit of the first layer can be represented as the following equation:

$$d_{min}^{(1-P)^2}[1]=\|r'-h_1\text{soft}[\bar{b}_1b_20b_4]\|^2,$$

$$d_{min}^{(1-P)^2}[2]=\|r'-h_1\text{soft}[b_1\bar{b}_2b_30]\|^2,$$

$$d_{min}^{(1-P)^2}[3]=\|r'-h_1\text{soft}[b_1b_2\bar{b}_3b_4]\|^2,$$

$$d_{min}^{(1-P)^2}[4]=\|r'-h_1\text{soft}[b_1b_2b_3\bar{b}_4]\|^2, \quad (7)$$

wherein when a symbol is transmitted, for four combinations of constellation points, $b_1b_3$ (or $b_2b_4$), "00" is mapped to "$+1/\sqrt{10}$", "01" is mapped to "$+3/\sqrt{10}$", "11" is mapped to "$-3/\sqrt{10}$" and "10" is mapped to "$-1/\sqrt{10}$".

Figure 5C:
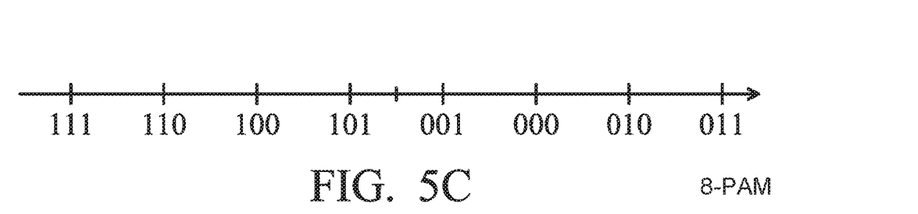

In yet another example, for 64 quadrature amplitude modulation (64-QAM), I and Q may be referred to as output values $b_1$, $b_3$, $b_5$ and $b_2$, $b_4$, $b_6$ respectively. 64-QAM can be considered as two independent 8-Pulse Amplitude Modulation (8-PAM), as shown in FIG. 5C. Therefore, the respective minimum Euclidean distances of each bit of the first layer can be represented as the following equation:

$$d_{min}^{(1-P)^2}[1]=\|r'-h_1\text{soft}[\bar{b}_1b_20b_41b_6]\|^2,$$

$$d_{min}^{(1-P)^2}[2]=\|r'-h_1\text{soft}[b_1\bar{b}_2b_30b_51]\|^2,$$

$$d_{min}^{(1-P)^2}[3]=\|r'-h_1\text{soft}[b_1b_2\bar{b}_3b_40b_6]\|^2,$$

$$d_{min}^{(1-P)^2}[4]=\|r'-h_1\text{soft}[b_1b_2b_3\bar{b}_4b_50]\|^2,$$

$$d_{min}^{(1-P)^2}[5]=\|r'-h_1\text{soft}[b_1b_2b_3b_4\bar{b}_5b_6]\|^2,$$

$$d_{min}^{(1-P)^2}[6]=\|r'-h_1\text{soft}[b_1b_2b_3b_4b_5\bar{b}_6]\|^2. \quad (7)$$

wherein when a symbol is transmitted, for sight combinations of constellation points, $b_1b_3b_5$ (or $b_2b_4b_6$), "001" is mapped to "$+1/\sqrt{42}$", "000" is mapped to "$+3/\sqrt{42}$", "010" is mapped to "$+5/\sqrt{42}$", "011" is mapped to "$+7/\sqrt{42}$", "110" is mapped to "$-5/\sqrt{42}$", "111" is mapped to "$-7/\sqrt{42}$", "100" is mapped to "$-3/\sqrt{42}$", and "101" is mapped to "$-1/\sqrt{42}$".

In summary, the LLR for the first layer and the LLRs of the remaining layers are obtained by using different methods, respectively, in the present invention, wherein only $Q^{\nu-1}+\log_2 Q$ kinds of possible combinations of constellation points need to be performed the calculations of the Euclidean distances. Therefore, it can effectively reduce the computational complexity of detecting signals in the MIMO communications system.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Persons with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Persons skilled in the art will appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A signal detection method, used in a multi-input multi-output (MIMO) communications system, comprising:
   receiving a first vector associated with data bits transmitted from the MIMO communications system;
   finding a first layer from the first received vector according to a determining condition, wherein the first received vector comprises multiple layers, and the multiple layers comprise the first layer and remaining layers;
   performing a first scanning procedure for the multiple layers of the first received vector to obtain log likelihood ratios (LLRs) corresponding to the data bits transmitted from the remaining layers;
   obtaining a second received vector of the first layer according to an equivalent received vector of the remaining layers; and
   performing a second scanning procedure on data bits of the first layer according to the second received vector of the first layer to generate an LLR corresponding to the data bits of the first layer,
   thereby reducing a complexity of the MIMO communications system.

2. The signal detection method as claimed in claim 1, wherein the step of finding the first layer from the first received vector according to the determining condition further comprises:
   scanning each combination of the remaining layers, obtaining a maximum likelihood (ML) value of the first layer and calculating Euclidean distances of the remaining layers when determining one of the combinations, wherein the first scanning procedure further comprises:
calculating the Euclidean distances of the remaining layers for all the combinations;
comparing the Euclidean distances of the remaining layers for all the combinations to each other;
updating respective minimum Euclidean distances of all layers and obtaining a minimum value from the respective minimum Euclidean distances as a first Euclidean distance, and obtaining a solution corresponding to the first Euclidean distance as the ML value; and
generating the LLRs corresponding to the data bits transmitted from the remaining layers according to the respective minimum Euclidean distances.

3. The signal detection method as claimed in claim 2, wherein the step of obtaining the second received vector of the first layer according to the equivalent received vector of the remaining layers further comprises:
obtaining the ML value according to the first Euclidean distance; and
removing the equivalent received vector of the remaining layers from the first received vector to obtain the second received vector of the first layer.

4. The signal detection method as claimed in claim 2, wherein the second scanning procedure further comprises:
calculating an Euclidean distance of each bit of the first layer;
comparing the Euclidean distance of each bit with a minimum Euclidean distance of the first layer;
taking the minimum value as the Euclidean distance of each bit of the first layer; and
generating the LLR corresponding to the data bits transmitted from the first layer according to the minimum Euclidean distance.

5. The signal detection method as claimed in claim 2, wherein the MIMO communications system has V transmission antennas, and a number of obtaining the respective minimum Euclidean distances is $Q^{V-1}+\log_2 Q$, where Q is a number of constellation points.

6. The signal detection method as claimed in claim 1, wherein the determining condition used to find the first layer from the first received vector is determined according one or more than one factor, the one or more than one factor comprising:
the first layer has the lowest data transmission rate in comparison with the remaining layers;
the first layer has a signal to noise ratio (SNR) higher than the remaining layers;
an initial hybrid automatic repeat request (HARQ) data is transmitted by the first layer; and
a modulation order used in the first layer is the lowest in all of the multiple layers.

7. The signal detection method as claimed in claim 1, wherein all of the multiple layers are composed of a plurality of independent symbols selected from a Q-ary constellation.

8. A signal detection apparatus in a multi-input multi-output (MIMO) communications system, the signal detection apparatus comprising:
a receiver configured to receive a first vector associated with data bits transmitted from the MIMO communications system;
a determining element configured to find a first layer from the first received vector according to a determining condition, wherein the first received vector comprises multiple layers, and the multiple layers comprise the first layer and remaining layers;
a scanning element configured to perform a first scanning procedure for the multiple layers of the first received vector to obtain log likelihood ratios (LLRs) corresponding to the data bits transmitted from the remaining layers; obtain a second received vector of the first layer according to an equivalent received vector of the remaining layers; and perform a second scanning procedure on data bits of the first layer according to the second received vector of the first layer to generate an LLR corresponding to the data bits of the first layer,
thereby reducing a complexity of the MIMO communications system.

9. The signal detection apparatus in the MIMO communications system as claimed in claim 8, wherein the determining element is configured to scan each combination of the remaining layers, obtain a maximum likelihood (ML) value of the first layer and calculate Euclidean distances of the remaining layers when determining one of the combinations, and the scanning element further comprises:
a distance-calculating element, configured to:
calculate the Euclidean distances of the remaining layers for all the combinations;
compare the Euclidean distances of the remaining layers for all the combinations to each other;
update respective minimum Euclidean distances of all layers and obtain a minimum value from the respective minimum Euclidean distances as a first Euclidean distance, and obtain a solution corresponding to the first Euclidean distance as the ML value; and
a soft-decision element configured to generate the LLRs corresponding to the data bits transmitted from the remaining layers according to the minimum Euclidean distances.

10. The signal detection apparatus in the MIMO communications system as claimed in claim 9, wherein the distance-calculating element is further configured to perform the step of obtaining the second received vector of the first layer according to the equivalent received vector of the remaining layers, the step comprising:
obtaining the ML value according to the first Euclidean distance; and
removing the equivalent received vector of the remaining layers from the first received vector to obtain the second received vector of the first layer.

11. The signal detection apparatus in the MIMO communications system as claimed in claim 9, wherein the second scanning procedure further comprises:
calculating an Euclidean distance of each bit of the first layer;
comparing the Euclidean distance of each bit with a minimum Euclidean distance of the first layer;
taking the minimum value as the Euclidean distance of each bit of the first layer; and
generating, by the soft-decision element, the LLR corresponding to the data bits transmitted from the first layer according to the minimum Euclidean distance.

12. The signal detection apparatus in the MIMO communications system as claimed in claim 9, wherein the multiple-input multiple-output communications system has V transmission antennas, and a number of obtaining the respective minimum Euclidean distances is $Q^{V-1}+\log_2 Q$, where Q is number of constellation points.

13. The signal detection apparatus in the MIMO communications system as claimed in claim 8, wherein the determining condition used to find the first layer from the first received vector is determined according one or more than one factor, the one or more than one factor comprising:
   the first layer has the lowest data transmission rate in comparison with the remaining layers;
   the first layer has a signal to noise ratio (SNR) higher than the remaining layers;
   an initial hybrid automatic repeat request (HARM) data is transmitted by the first layer; and
   a modulation order used in the first layer is the lowest in all of the multiple layers.

14. The signal detection apparatus in the MIMO communications system as claimed in claim 8, wherein all of the multiple layers are composed of a plurality of independent symbols selected from a Q-ary constellation.

* * * * *